United States Patent
Skarda (10) Patent No.: US 10,909,267 B2
(45) Date of Patent: Feb. 2, 2021

(54) SYSTEM FOR ACCOUNT RESTRICTIONS

(71) Applicant: PAYPAL, INC., San Jose, CA (US)

(72) Inventor: Bryant Skarda, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 235 days.

(21) Appl. No.: 15/999,675

(22) Filed: Aug. 20, 2018

(65) Prior Publication Data

US 2019/0080106 A1     Mar. 14, 2019

Related U.S. Application Data

(60) Provisional application No. 62/547,376, filed on Aug. 18, 2017.

(51) Int. Cl.
| | | |
|---|---|---|
| *G06F 21/62* | (2013.01) | |
| *G06Q 50/00* | (2012.01) | |
| *G06Q 30/04* | (2012.01) | |
| *G06F 16/9535* | (2019.01) | |

(52) U.S. Cl.
CPC ........ *G06F 21/629* (2013.01); *G06F 16/9535* (2019.01); *G06Q 30/04* (2013.01); *G06Q 50/01* (2013.01)

(58) Field of Classification Search
CPC ... G06F 21/629; G06F 16/9535; G06Q 50/01; G06Q 30/04
See application file for complete search history.

(56) References Cited

U.S. PATENT DOCUMENTS

| | | | |
|---|---|---|---|
| 6,073,104 A | 6/2000 | Field | |
| 7,308,431 B2 | 12/2007 | Asokan et al. | |
| 7,313,544 B1 * | 12/2007 | Bryman | G06Q 20/042 |
| | | | 235/379 |
| 9,888,290 B1 * | 2/2018 | Malhotra | H04N 21/4751 |
| 10,091,363 B2 * | 10/2018 | Velusamy | H04L 67/36 |
| 10,142,450 B1 * | 11/2018 | Clay | H04M 1/72522 |
| 2006/0230145 A1 * | 10/2006 | Zarakhovsky | H04L 63/08 |
| | | | 709/225 |
| 2010/0280935 A1 * | 11/2010 | Fellowes | G06Q 40/00 |
| | | | 705/35 |
| 2014/0012733 A1 * | 1/2014 | Vidal | H04L 51/12 |
| | | | 705/37 |
| 2014/0330680 A1 * | 11/2014 | Gopinath | G06Q 50/01 |
| | | | 705/26.82 |
| 2016/0294753 A1 * | 10/2016 | Centner | H04L 51/12 |
| 2016/0335679 A1 * | 11/2016 | Kshirsagar | G06F 21/31 |
| 2016/0343062 A1 * | 11/2016 | Morton | G06Q 30/0635 |
| 2017/0124538 A1 * | 5/2017 | Rouda | G06Q 20/405 |
| 2017/0177891 A1 * | 6/2017 | Hampson | G06F 21/6218 |
| 2018/0104813 A1 * | 4/2018 | Buzi | A63H 33/22 |
| 2018/0309708 A1 * | 10/2018 | Potvin | G06Q 10/107 |
| 2019/0007519 A1 * | 1/2019 | Doran | H04L 67/20 |

* cited by examiner

*Primary Examiner* — Matthew Smithers
(74) *Attorney, Agent, or Firm* — Haynes and Boone, LLP (57) ABSTRACT

A computer system detects, at time period one, that a first user of a computing device has not paid a transmitted invoice. In response to the detecting, at time period one, that the first user of the computing device has not paid the transmitted invoice, the computer system applies one or more restrictions to a first social media account corresponding to the first user. In response to the detecting, at time period two, that the first user has paid the transmitted invoice, the computer system removes the one or more restrictions from the first social media account, wherein time period two is after time period one.

20 Claims, 7 Drawing Sheets

SYSTEM FOR ACCOUNT RESTRICTIONS

CROSS-REFERENCE TO RELATED APPLICATIONS

This application claims the benefit of U.S. Provisional Patent Application No. 62/547,376, entitled "Creation of Custom Bitmojis," filed on Aug. 18, 2017, the disclosure of which is hereby expressly incorporated herein by reference in its entirety.

TECHNICAL FIELD

The present disclosure relates generally to restrictions, and more particularly to applying restrictions to one or more accounts.

BACKGROUND

In today's age, the use of social media applications has massively exploded. Social media has become a focal point of our lives, providing us with news, entertainment, a social outlet, and also a way to connect with people from all over the world. The growing popularity of social media and social media applications provides an opportunity for the payments industry and can provide assistance and a means to a user attempting to collect a payment.

DETAILED DESCRIPTION

Embodiments of the present disclosure provide a system, method, and program product. A computer system detects, at time period one, that a first user of a computing device has not paid a transmitted invoice. In response to the detecting, at time period one, that the first user of the computing device has not paid the transmitted invoice, the computer system applies one or more restrictions to a first social media account corresponding to the first user. In response to the detecting, at time period two, that the first user has paid the transmitted invoice, the computer system removes the one or more restrictions from the first social media account, wherein time period two is after time period one.

In the example embodiment, the present disclosure describes a solution to the problem of efficiently creating a custom bitmoji. In the example embodiment, the present disclosure describes a solution for identifying user information of the user of computing device 110, which may include social media information, biographic information, and/or any other user information, and based on an analysis of the user information creating a custom bitmoji.

In the example embodiment, the present disclosure further describes a solution to the problem of a solution of transmitting an invoice to a user, and based on detecting that the user has not paid the invoice, applying a filter restriction to one or more social media accounts of the user.

In the example embodiment, the present disclosure further describes identifying users in a group, such as identifying people in a group image. Further, the present disclosure describes creating a custom filter, which may be transmitted to the group based on a situation, a location, or an event associated with the group.

In the example embodiment, the present disclosure further describes receiving a payment, and further based on determining that a specific financial goal or goals has been met, the present disclosure describes creating a customer filter and allowing use of the custom filter by one or more users associated with the specific financial goal or goals.

Embodiments of the present disclosure will now be described in detail with reference to the accompanying Figures.

Figure 1:
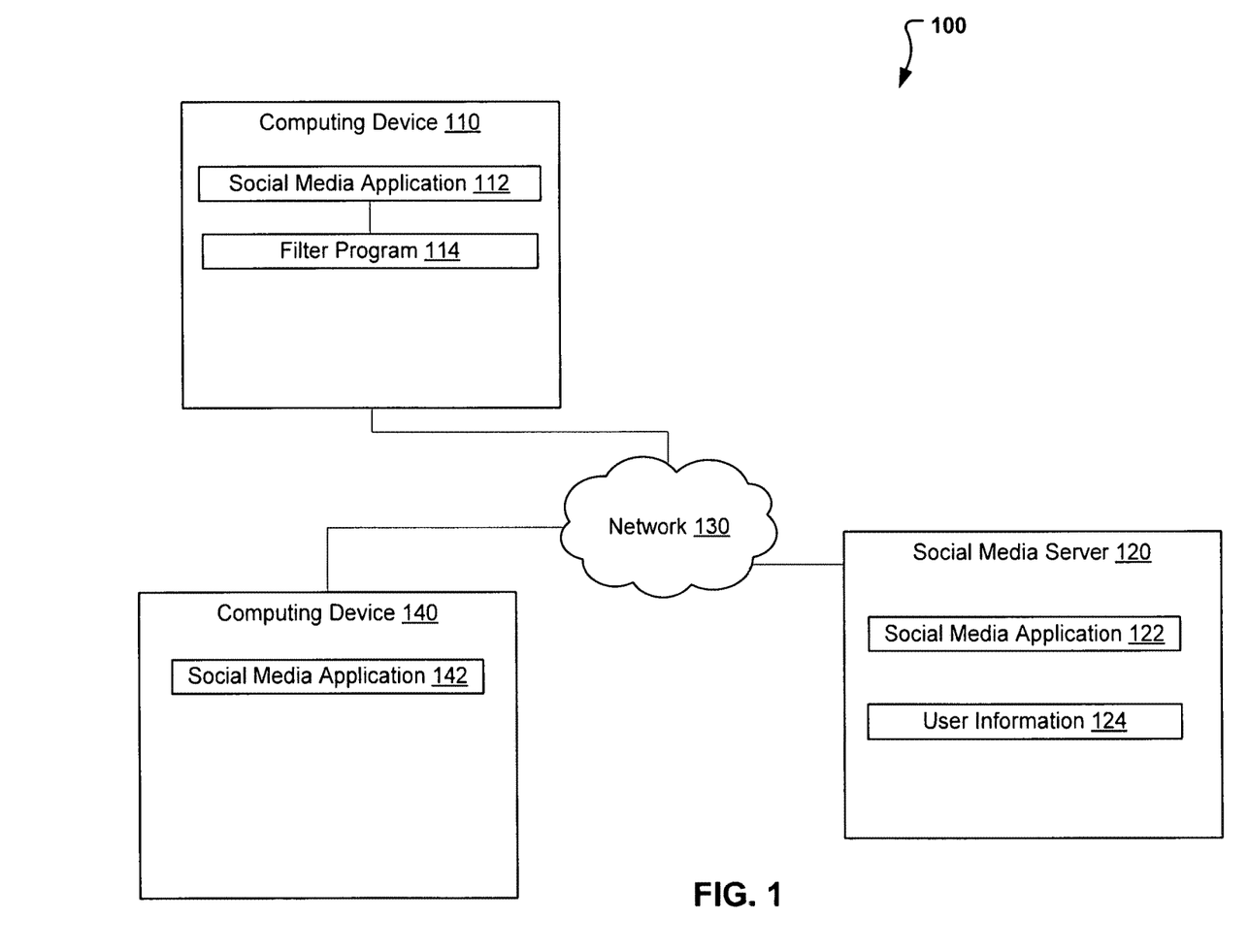
FIG. 1 illustrates a custom filter system, in accordance with an embodiment.

FIG. 1 illustrates custom filter system 100, in accordance with an embodiment. In the example embodiment, custom filter system includes computing device 110, computing device 140, and social media server 120 interconnected via network 130.

Social media server 120 includes social media application 122 and user information 124. In the example embodiment, social media server 120 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, social media server 120 can comprise a cluster of servers executing the same software to collectively process requests as distributed by a front end server and a load balancer. In the example embodiment, social media server 120 is a server that supports social media application 122. Social media server 120 is described in more detail with reference to FIG. 7.

Social media application 122 is a server side social media application or program. In the example embodiment, user information 124 includes information corresponding to one or more client-side users of social media application 122, such as pictures, comments, videos, likes/dislikes, interests, and additional types of information that may correspond to a social media account. Social media application 122 and user information 124 are described in more detail with reference to FIGS. 3 through 6.

Computing device 140 includes social media application 142. In the example embodiment, computing device 140 is a computing device such as a smartphone, however in other embodiments, computing device 140 may be a desktop computer, a laptop computer, a tablet computer, a handheld device, a thin client, or any other electronic device or computing system capable of receiving and sending data to and from other computing devices, such as social media server 120, via network 130. Computing device 140 is described in more detail with reference to FIG. 7.

In the example embodiment, social media application 142 is a client-side social media application of social media application 122 hosted on social media server 120. Social media application 142 is described in more detail with reference to FIGS. 3 through 6.

Computing device 110 includes social media application 112 and filter program 114. In the example embodiment, computing device 110 is a computing device such as a smartphone, however in other embodiments, computing device 110 may be a desktop computer, a laptop computer, a tablet computer, a handheld device, a thin client, or any other electronic device or computing system capable of receiving and sending data to and from other computing devices, such as social media server 120, via network 130. Computing device 110 is described in more detail with reference to FIG. 7.

In the example embodiment, social media application 112 is a client side social media application of social media application 122 hosted on social media server 120. Social media application 112 is described in more detail with reference to FIGS. 3 through 6.

In the example embodiment, filter program 114 is a program that is capable of identifying user information, analyzing the user information, and based on the analysis, creating a custom bitmoji. Furthermore, filter program 114 is capable of transmitting an invoice to a user, detected that the invoice has not been paid, and further applying a restriction, such as a social media restriction to an account of the user. Furthermore, filter program 114 is capable of creating a custom bitmoji, custom filter, or custom bitmoji filter based on the detection of a situation, or the detection of an achievement being reached, such as a financial goal being reached. The operations of filter program 114 are described in further detail with regard to FIGS. 3 through 6.

Figure 2:
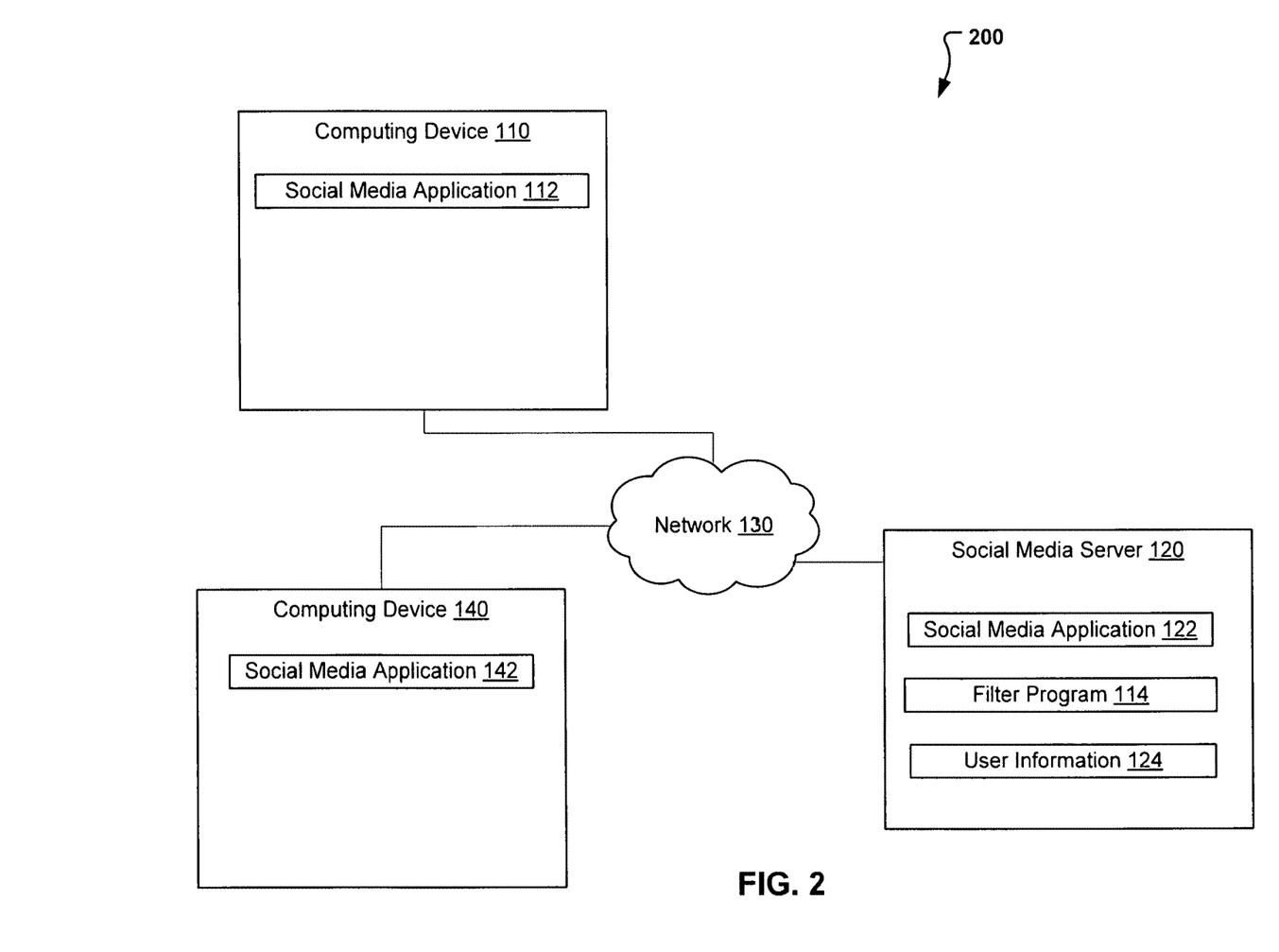
FIG. 2 illustrations an alternate embodiment of the custom filter system of FIG. 1, in accordance with an embodiment.

FIG. 2 depicts an alternate embodiment of custom filter system 100, in accordance with an embodiment. In the example embodiment, custom filter system 200 includes filter program 114 being located on social media server 120. In this alternate embodiment, filter program 114 may communicate directly with one or more applications present on social media server 120, or may communicate with one or more applications present on computing device 110 and computing device 140. Furthermore, filter program 114 may utilize one or more client-side filter programs present on client-side devices, such as computing device 110 and computing device 140 to perform specific operations.

In one or more alternate embodiments, social media server 120 may be a server serving another type of application, with a client-side application being present on computing device 110 and computing device 140.

Figure 3:
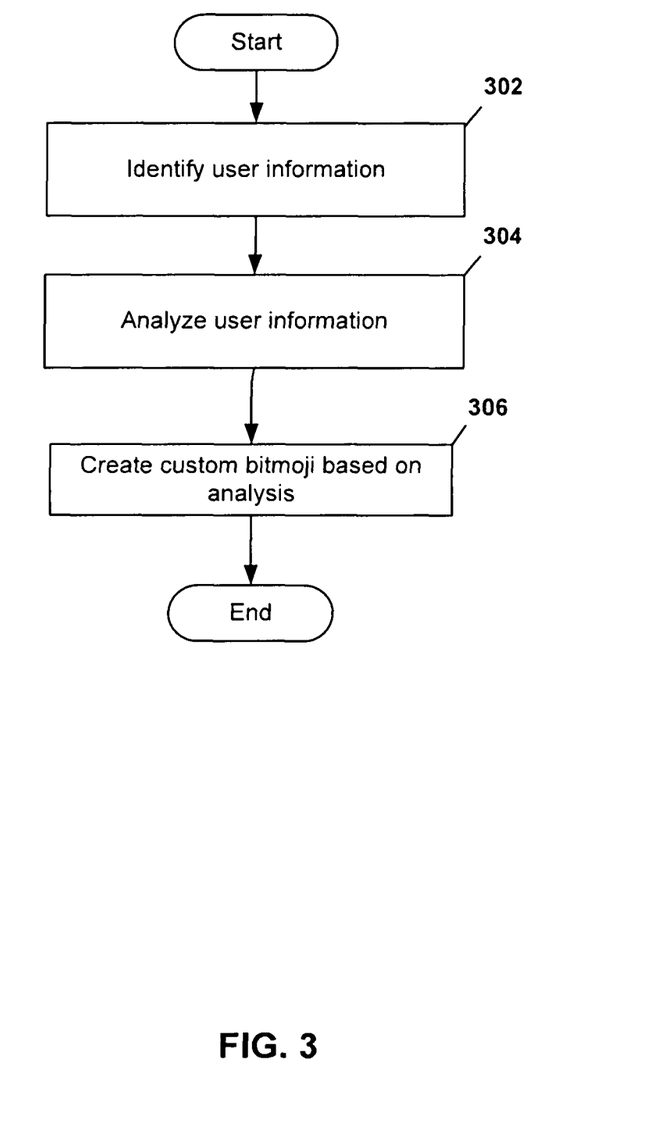
FIG. 3 is a flowchart illustrating the operations of the filter program of FIG. 1 in identifying user information and determining a custom bitmoji based on an analysis of the user information, in accordance with an embodiment.

FIG. 3 is a flowchart illustrating the operations of filter program 114 in identifying user information and determining a custom bitmoji based on an analysis of the user information, in accordance with an embodiment. In the example embodiment, filter program 114 identifies user information associated with the user of computing device 110 (step 302). In the example embodiment, filter program 114 may identify user information for the user of computing device 110 by way of user input, and further by way of analyzing user activity on one or more applications of computing device 110. For example, filter program 114 may analyze user activity on social media application 112, such as pictures, comments, videos, likes/dislikes, interests, etc., and based on the analysis determine information about the user of computing device 110, such as mannerisms, fashion style, facial structure, appearance, body type, mouth movements, facial movements, gestures, interests of the user, and the like. Furthermore, filter program 114 may determine usage habits in one or more applications, and further reference user information stored on computing device 110, and on servers associated with one or more applications on computing device 110.

In the example embodiment, filter program 114 may analyze the user information (step 304), as described above, and create a custom bitmoji based on the analysis of the user information (step 306). In the example embodiment, filter program 114 may analyze the user information, as described above, and identify an appearance of the user, a style of the user, and mannerisms of the user, and utilize the information to form the basic appearance of a custom bitmoji. Therefore, in the example embodiment, the custom bitmoji would be a character that would resemble the user of computing device 110, however, in other embodiments, the custom bitmoji may have an appearance that does not resemble the user of computing device 110. Further, filter program 114 may utilize the user information, such as gestures and facial movements in creating actions corresponding to the bitmoji, or dynamic movements that the bitmoji may do. In the example embodiment, when creating the custom bitmoji, filter program 114 may create a custom image or dynamic image (such as a .gif file) for a plurality of specific situations. Filter program 114 may map each custom image or dynamic image to a specific situation based on the situation. For example, for a situation of the user of computing device 110 receiving money (such as from another user), an image may be created with the custom bitmoji throwing dollar bills into the air, or alternatively with the custom bitmoji handing currency over for a new watch (if the user information includes information about the user liking watches). In the example embodiment, filter program 114 may additionally analyze a message, such as a social media comment input by the user of computing device 110, or a notification, and utilize natural language processing to analyze the message/notification. Filter program 114 may then identify a custom bitmoji that corresponds to the message/notification and further insert the corresponding custom bitmoji into the message, integrate the corresponding custom bitmoji with the message, or associate the corresponding custom bitmoji with the message.

In one or more embodiments, the process described above may be used to create a custom emoji, and custom images/dynamic images that include the custom emoji, in a similar manner as described above.

Figure 4:
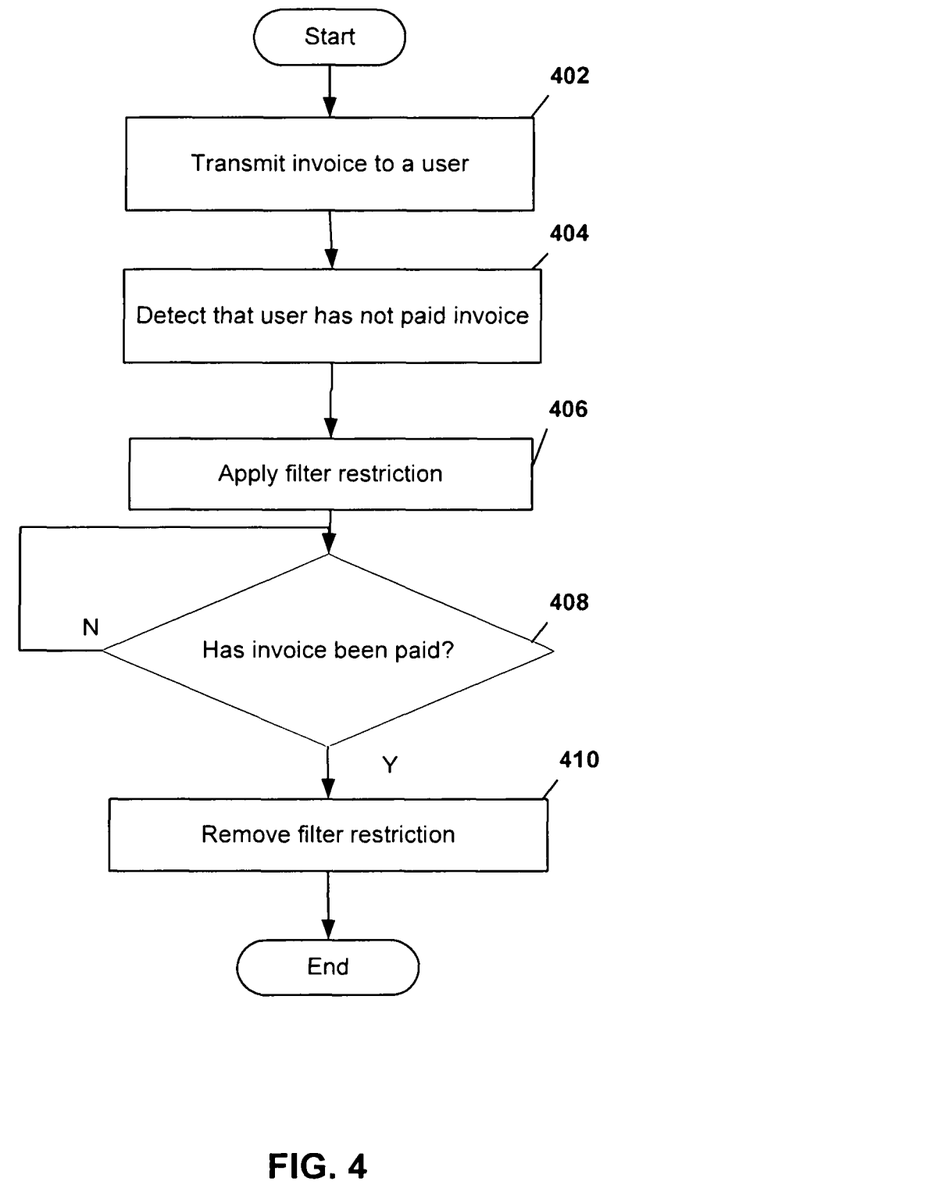
FIG. 4 is a flowchart illustrating the operations of the filter program of FIG. 1 in detecting that a user has not paid an invoice and applying a filter restriction to an application corresponding to the user, in accordance with an embodiment.

FIG. 4 is a flowchart illustrating the operations of the filter program 114 in detecting that a user has not paid an invoice and applying a filter restriction to an application corresponding to the user, in accordance with an embodiment. In the example embodiment, filter program 114 transmits an invoice to a user of computing device 140 (step 402). In the example embodiment, the invoice may be transmitted based on a user input by the user of computing device 110. In other embodiments, rather than transmitting the invoice, filter program 114 may detect that an invoice has been transmitted to the user of computing device 140.

Filter program 114 detects that the invoice has not been paid by the user of computing device 140 (step 404). In the example embodiment, filter program 114 may monitor incoming and outgoing transactions to determine that the invoice has not been paid by the user of computing device 140. In one or more embodiments, this may include monitoring one or more applications on computing device 110, and identifying if any transactions occurring on the one or more applications correspond to the user of computing device 140. In the example embodiment, filter program 114 may maintain a mapping of the multiple users that the user of computing device 110 has transacted with, including a mapping of the multiple users across multiple applications. Therefore, filter program 114 may be able to identify the user of computing device 140 across multiple applications.

Filter program 114 applies a filter restriction to computing device 140 (step 406). In the example embodiment, filter program 114 may transmit a request to an application, such as social media application 122, to apply the filter restriction to social media application 142 on computing device 140 (or to apply the filter restriction to a social media account associated with the user of computing device 140). In other embodiments, filter program 114 may apply the filter restriction directly onto social media application 142 via network 130 (or to a social media account associated with the user of computing device 140). In this other embodiment, filter program 114 may be given prior permission to make such restrictions by the user of computing device 140. Alternatively, the user of computing device 140 may opt in to a program with social media application, which may allow other users, such as the user of computing device 110, based on an invoice not being paid, to impose restrictions on their social media application (and/or social media account). In the example embodiment, the filter restriction may include a restriction on the filters available for the user of computing device 140 to use in social media application 142. In other embodiments, the filter restriction may impose a watermark on social media comments made by the user of computing device 140 via a social media account accessed by utilizing social media application 142. For example, the watermark may be present on any picture, video or comment posted. The watermark may say "User A owes User B money" or a similar assertion. In addition, further restrictions may be imposed such as certain social media capabilities not being available to the user of computing device 140. For example, the user of computing device 140 may not be able to utilize his/her social media account to make a purchase, or to order delivery. In another example, the further restrictions may include certain emojis, characters, or communication methods may not be available in the social media account of the user of computing device 140. In another example, the further restrictions may include a usage restriction that restricts communication by the user of computing device 140, by for example, not allowing the user to utilize his/her social media account (or an application, such as social media application 142) to contact a particular user or user. For example, the user of computing device 140 may not be able to utilize his/her social media account to contact the user of computing device 110, or other users associated with the user of computing device 110.

Filter program 114 determines if the invoice has been paid by the user of computing device 140 (decision 408). Filter program 114 determines if the invoice has been paid by monitoring one or more applications on computing device 110, as described above. If filter program 114 determines that the invoice has not been paid (decision 408, "NO" branch), filter program 114 continues to monitor one or more applications on computing device 110 to determine whether the invoice has been paid by the user of computing device 140. If filter program 114 determines that the invoice has been paid (decision 408, "YES" branch), filter program 114 removes the filter restriction associated with computing device 140 (step 410). In the example embodiment, filter program 114 may transmit a request to a server-side application, such as social media application 122, to remove the filter restriction associated with social media application 142 and/or the social media account associated with the user of computing device 140. In other embodiments, filter program 114 may remove the filter restriction associated with social media application 142 (or the social media account associated with the user of computing device 140) directly via network 130.

In other embodiments, as depicted in FIG. 2, filter program 114 may be located on social media server 120, and may apply a filter restriction or any other restriction as discussed above to a social media account associated with a user that has not paid an invoice. For example, based on filter program 114 (located on social media server 120) determining that the user of computing device 140 has not paid an invoice to him/her by the user of computing device 110, filter program 114 (located on social media server 120) may apply a filter restriction (or other type of restriction) to the social media account of the user of computing device 140.

Figure 5:
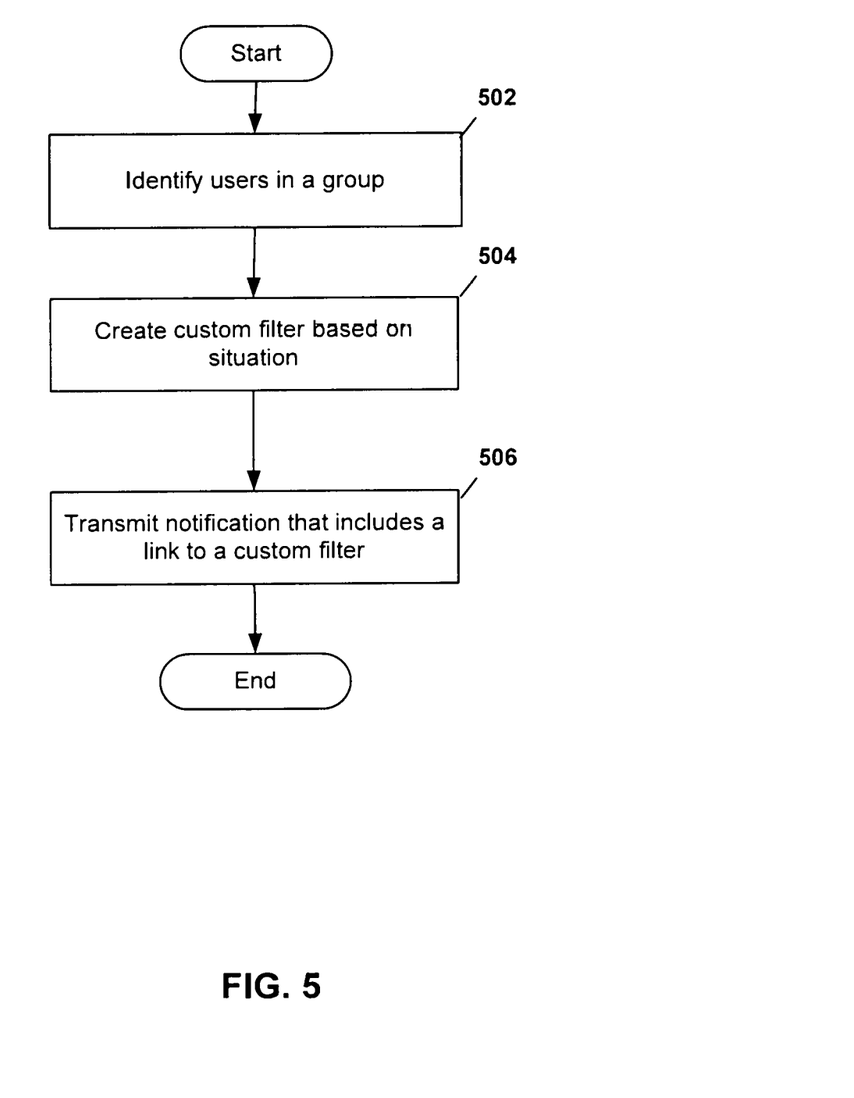
FIG. 5 is a flowchart illustrating the operations of the filter program of FIG. 1 in identifying users in a group and creating a custom filter based on a current situation, in accordance with an embodiment.

FIG. 5 is a flowchart illustrating the operations of filter program 114 in identifying users in a group and creating a custom filter based on a current situation, in accordance with an embodiment. In the example embodiment, filter program 114 identifies users in a group image or within a view direction by utilizing facial recognition technology (step 502). For example, filter program 114 may analyze an image and compare the faces in the image to a facial recognition database to identify each individual user in the image. In other embodiment, the user of computing device 110, or another user may input the identifications of the individuals in the image.

Filter program 114 creates a custom filter based on the situation, event, or location where the image was taken (step 504). In the example embodiment, filter program 114 may create a custom filter based on the identified individual and further based on custom bitmojis associated with the individuals. For example, the custom filter may include all the custom bitmojis for each of the identified individuals. Additionally, filter program 114 may determine a specific custom bitmoji for each of the individual users based on the situation, event, or location. For example, the user of computing device 110 may have bitmoji 1 mapped to the situation of "eating out", and therefore, if the image is taken in a restuarant, the custom filter may include bitmoji 1 above the image of the user of computing device 110. In further embodiments, custom group bitmojis or custom filters may be mapped to specific groups. Therefore, if individual 1, 2 and 3 are in the image, and a custom filter is mapped to the specific group of individual 1, 2, and 3, filter program 114 identifies the custom filter. In another example, if individual 1, 2 and 3 are in the image, and a custom bitmoji is mapped to the specific group of individual 1, 2, and 3, filter program 114 may create a custom filter that includes the determined custom bitmoji.

Filter program 114 transmits a notification to all the identified individuals that includes a link, such as a deep link, to the custom filter (step 506). In other embodiments, filter program 114 may just make the custom filter available to the identified individuals in their respective social media applications.

Figure 6:
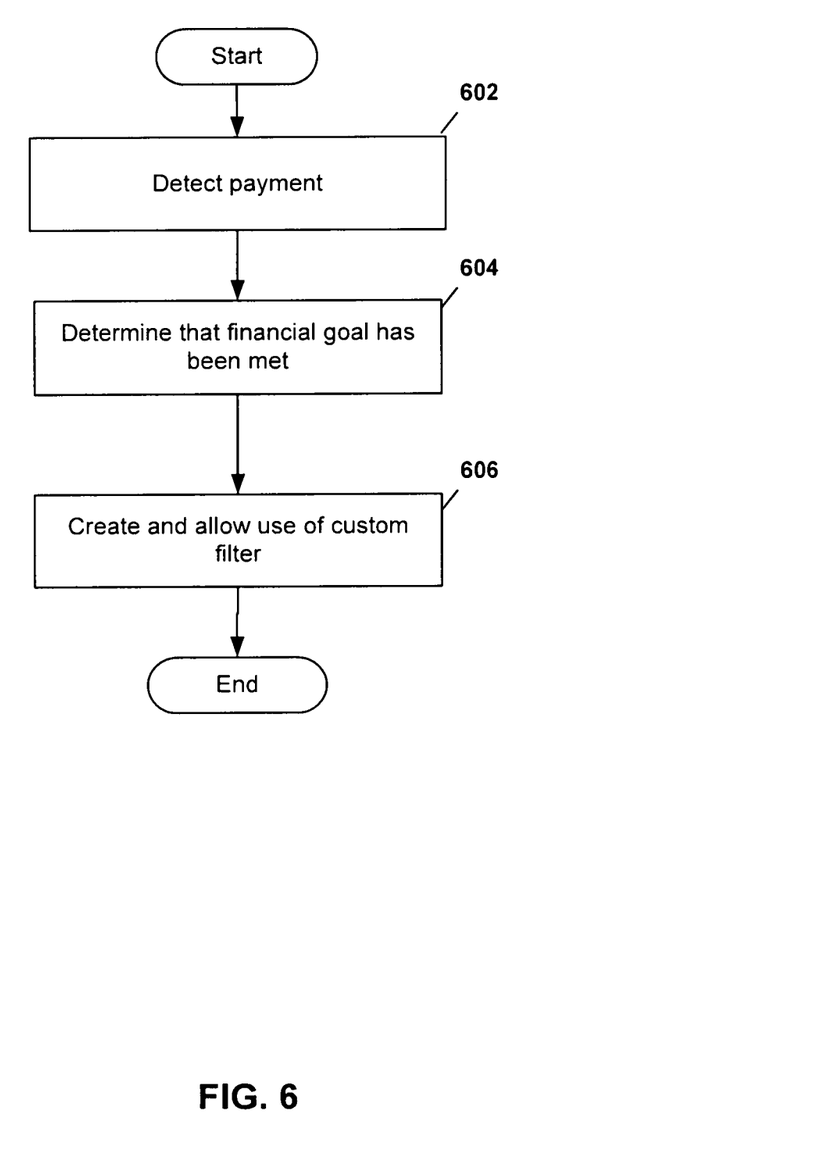
FIG. 6 is a flowchart illustrating the operations of the filter program of FIG. 1 in creating and allowing the use of a custom filter based on a financial goal being met, in accordance with an embodiment.

FIG. 6 is a flowchart illustrating the operations of filter program 114 in creating and allowing the use of a custom filter based on a financial goal being met, in accordance with an embodiment. In the example embodiment, filter program 114 detects a payment or a money transfer to an account of the user of computing device 110 (step 602). In the example embodiment, filter program 114 may monitor one or more financial accounts in order to detect whether a payment or money enters or is transferred to the account of the user of computing device 110. For example, filter program 114 may detect that a payment has been made to an account of the user of computing device 110 by another user, or that a direct deposit has been made to the account of the user of computing device 110.

In the example embodiment, filter program 114 determines that a financial goal has been met or exceeded (step 604). In the example embodiment, filter program 114 determines that the detected payment or money transfer has allowed the financial goal to met or exceeded.

In the example embodiment, filter program 114 creates and/or allows the use of a functionality within an application, such as a custom filter or a custom bitmoji, based on determining that the financial goal being met or exceeded (step 606). For example, a custom filter or bitmoji that corresponds to the financial goal may be created or a custom bitmoji/filter that corresponds to all the donors who donated during a fundraiser may be created. Furthermore, in the example embodiment, filter program 114 allows the custom filter or custom bitmoji to be utilized by individuals who were associated with the financial goal being met or exceeded (such as the donors for a fundraiser). In other embodiments, the custom filter or custom bitmoji may be available to additional users/individuals.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 7:
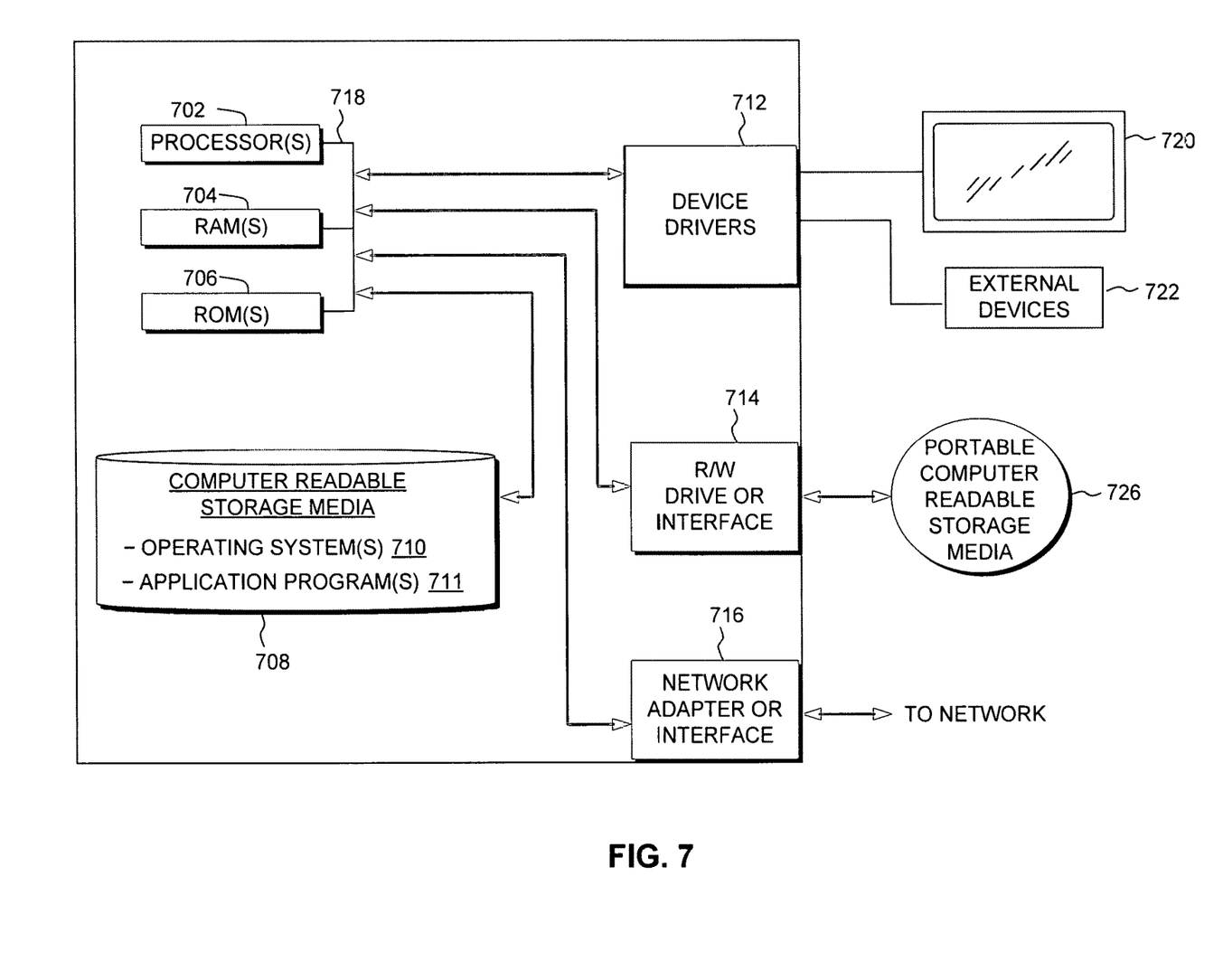
FIG. 7 is a block diagram depicting the hardware components of the custom filter system of FIG. 1, in accordance with an embodiment.

FIG. 7 depicts a block diagram of components of computing devices contained in customer filter system 100 of FIG. 1 and custom filter system 200 of FIG. 2, in accordance with an embodiment. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, filter program 114, are stored on one or more of the computer readable storage media 708 for execution by one or more of the processors 702 and by utilizing one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a display screen 720, and external devices 722, which may include, for example a keyboard, a computer mouse and/or touchpad. Device drivers 712 interface to display screen 720 for imaging, to external devices 722, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
   one or more computer-readable memories storing program instructions; and
   one or more processors configured to execute the program instructions to cause the system to perform operations comprising:
      detecting, at time period one, that a first user of a computing device has not paid a transmitted invoice;
      in response to the detecting, at time period one, that the first user of the computing device has not paid the transmitted invoice, applying one or more restrictions to a first social media account corresponding to the first user, wherein the one or more restrictions includes a restriction on the usage of one or more bitmojis; and
      in response to the detecting, at time period two, that the first user has paid the transmitted invoice, removing the one or more restrictions from the first social media account, wherein time period two is after time period one.

2. The system of claim 1, further comprising determining a mapping of the first user of the computing device to an account corresponding to another application.

3. The system of claim 2, wherein the one or more restrictions further includes a restriction associated with the account corresponding to the other application.

4. The system of claim 1, wherein the one or more restrictions further includes a restriction on the usage of one or more communication methods in a social media application corresponding to the first social media account.

5. The system of claim 1, wherein the one or more restrictions further includes a restriction that prevents the first user from utilizing the first social media account to make a purchase.

6. The system of claim 1, wherein the one or more restrictions further includes a filter restriction that includes a background image being imposed on all messages transmitted by the first user within a social media application corresponding to the first social media account.

7. The system of claim 1, wherein the one or more restrictions further includes a restriction on communication with a second user corresponding to a second social media account.

8. A method comprising:
    detecting, at time period one, that a first user of a computing device has not paid a transmitted invoice;
    in response to the detecting, at time period one, that the first user of the computing device has not paid the transmitted invoice, applying one or more restrictions to a first account of a first application, the first account corresponding to the first user, wherein the one or more restrictions includes a restriction on the usage of one or more bitmojis; and
    in response to the detecting, at time period two, that the first user has paid the transmitted invoice, removing the one or more restrictions from the first account, wherein time period two is after time period one.

9. The method of claim 8, wherein the detecting, at time period one, that the first user of the computing device has not paid the transmitted invoice includes monitoring one or more transactions corresponding to the first user across one or more applications.

10. The method of claim 8, wherein the detecting, at time period one, that the first user of the computing device has not paid the transmitted invoice includes monitoring one or more transactions corresponding to the first user across a plurality of applications.

11. The method of claim 8, wherein the one or more restrictions further includes a restriction on the usage of one or more communication methods in the first application.

12. The method of claim 8, wherein the one or more restrictions further includes a restriction on the usage of one or more emojis.

13. The method of claim 8, wherein the one or more restrictions further includes a restriction that prevents the first user from utilizing the first social media account to make a purchase.

14. The method of claim 8, wherein the one or more restrictions further includes a filter restriction that includes a watermark being imposed on all messages transmitted by the first user within the first application.

15. The method of claim 8, wherein the one or more restrictions further includes a restriction on communication with a second user corresponding to a second account of the first application.

16. A non-transitory machine-readable medium comprising instructions which, in response to execution by a computer system, cause the computer system to perform operations comprising:
    detecting, at time period one, that a first user of a computing device has not paid a transmitted invoice;
    in response to the detecting, at time period one, that the first user of the computing device has not paid the transmitted invoice, applying one or more restrictions to a first social media account corresponding to the first user, wherein the one or more restrictions includes a restriction on the usage of one or more bitmojis; and
    in response to the detecting, at time period two, that the first user has paid the transmitted invoice, removing the one or more restrictions from the first social media account, wherein time period two is after time period one.

17. The non-transitory machine readable medium of claim 16, further comprising determining a mapping of the first user of the computing device to an account corresponding to another application.

18. The non-transitory machine readable medium of claim 17, wherein the one or more restrictions further includes a restriction associated with the account corresponding to the other application.

19. The non-transitory machine readable medium of claim 16, wherein the one or more restrictions further includes a restriction on the usage of one or more communication methods in a social media application corresponding to the first social media account.

20. The non-transitory machine readable medium of claim 16, wherein the one or more restrictions further includes a restriction that prevents the first user from utilizing the first social media account to make a purchase.

* * * * *